United States Patent [19]

Hitotsumachi

[11] Patent Number: 4,901,159
[45] Date of Patent: Feb. 13, 1990

[54] MAGNETIC RECORDING APPARATUS FOR RECORDING VIDEO AND TWO KINDS OF AUDIO SIGNALS

[75] Inventor: Shuzo Hitotsumachi, Kyoto, Japan
[73] Assignee: Matsushita Electric Industrial Co., Ltd., Osaka, Japan
[21] Appl. No.: 184,870
[22] Filed: Apr. 22, 1988
[30] Foreign Application Priority Data

May 14, 1987 [JP] Japan ................. 62-117367

[51] Int. Cl.[4] .......................................... H04N 5/782
[52] U.S. Cl. ................................. 358/330; 358/341; 360/19.1; 360/33.1
[58] Field of Search ..................... 358/310, 330, 341; 360/33.1, 19.1, 73.04, 73.05, 73.06, 73.07, 73.08

[56] References Cited

U.S. PATENT DOCUMENTS

| | | | |
|---|---|---|---|
| 4,725,896 | 2/1988 | Ohira et al. | 358/330 |
| 4,752,832 | 6/1988 | Higurashi | 358/330 X |
| 4,814,902 | 3/1989 | Fujiwara et al. | 360/33.1 |

FOREIGN PATENT DOCUMENTS 55-77012 6/1980 Japan ................. 360/19.1
59-202783 11/1984 Japan ................. 358/341

OTHER PUBLICATIONS

"The Sony Broadcast Approach to One Inch Format Video Recording" Hadley, In'tl Broadcast Engineer vol. 10, No. 164, pp. 18–20, Mar. 1979.

*Primary Examiner*—Aristotelis M. Psitos
*Attorney, Agent, or Firm*—Pollock, VandeSande & Priddy

[57] ABSTRACT

A recording and reproducing apparatus includes three groups of magnetic heads. A sound signal is converted into a corresponding frequency-modulated signal and is also converted into a corresponding digital signal. The frequency-modulated sound signal is recorded into and reproduced from a magnetic tape via the first group of magnetic heads. The digital sound signal is converted into a corresponding quadrature phase shift keying signal. The quadrature phase shift keying sound signal is recorded into and reproduced from the magnetic tape via the second group of magnetic heads. A video signal is recorded into and reproduced from the magnetic tape via the third group of magnetic heads.

5 Claims, 3 Drawing Sheets

MAGNETIC RECORDING APPARATUS FOR RECORDING VIDEO AND TWO KINDS OF AUDIO SIGNALS

BACKGROUND OF THE INVENTION

This invention relates to a recording and reproducing apparatus such as a video tape recorder.

Recently, pulse code modulation (PCM) has been used in recording and reproducing sound signals to maintain an excellent sound quality. High fidelity video tape recorders convert sound signals into frequency-modulated (FM) signals and record the FM signals in magnetic tapes. Advanced 8-millimeter video tape recorders can handle both a PCM sound signal and an FM sound signal and record them simultaneously in a magnetic tape.

It is better to increase sound fidelities of video tape recorders, such as 8-millimeter video tape recorders.

SUMMARY OF THE INVENTION

It is an object of this invention to provide a recording and reproducing apparatus having a high fidelity.

In a recording and reproducing apparatus according to a first aspect of this invention, a first group of magnetic heads has different azimuth angles, and a second group of magnetic heads has different azimuth angles which also differ from the azimuth angles of the magnetic heads in the first group. A third group of magnetic heads has different azimuth angles which also differ from the azimuth angles of the magnetic heads in the first and second groups. A first modulator converts a first input signal into a corresponding frequency-modulated signal. An output signal of the first modulator is applied to the first group of the magnetic heads. A first demodulator demodulates a signal reproduced via the first group of the magnetic heads. A first digital signal processor converts the first input signal into a corresponding digital signal and processes the digital signal. An output signal of the digital signal processor is applied to the second group of the magnetic heads. A second digital signal processor processes a signal reproduced via the second group of the magnetic heads and converts the reproduced and processed signal into an analog signal. A first signal processor separates an input video signal into a luminance signal and a chrominance signal. A second modulator converts output signals of the first signal processor into a corresponding frequency-modulated luminance signal and a corresponding down-converted chrominance signal. An output signal of the second modulator is applied to the third group of the magnetic heads. A second demodulator converts a signal, reproduced via the third group of the magnetic heads, into a luminance signal and a chrominance signal. A second signal processor converts output signals of the second demodulator into a video signal. A detector senses a sensed portion of a magnetic tape cassette and generates a detection signal representative thereof. The application of the output signal of the first digital signal processor to the second group of the magnetic heads is enabled in accordance with the detection signal. A frequency of a carrier of the frequency-modulated luminance signal is increased in accordance with the detection signal.

In a recording and reproducing apparatus according to a second aspect of this invention, 2-channel input sound signals are converted into a corresponding frequency-modulated sound signal. A first magnetic head records and reproduces the frequency-modulated sound signal into and from a first track in a magnetic tape. The 2-channel input sound signals are converted into corresponding digital sound signals. The digital sound signals are converted into a corresponding phase-modulated sound signal. A second magnetic head records and reproduces the phase-modulated sound signal into and from a second track in the magnetic tape. An input video signal is processed and is thus converted into a processed video signal. A third magnetic head records and reproduces the processed video signal into and from a third track in the magnetic tape. The first, second, and third magnetic heads have different azimuth angles. The first, second, and third tracks at least partially overlap each other.

DESCRIPTION OF THE PREFERRED EMBODIMENT

Figure 1:
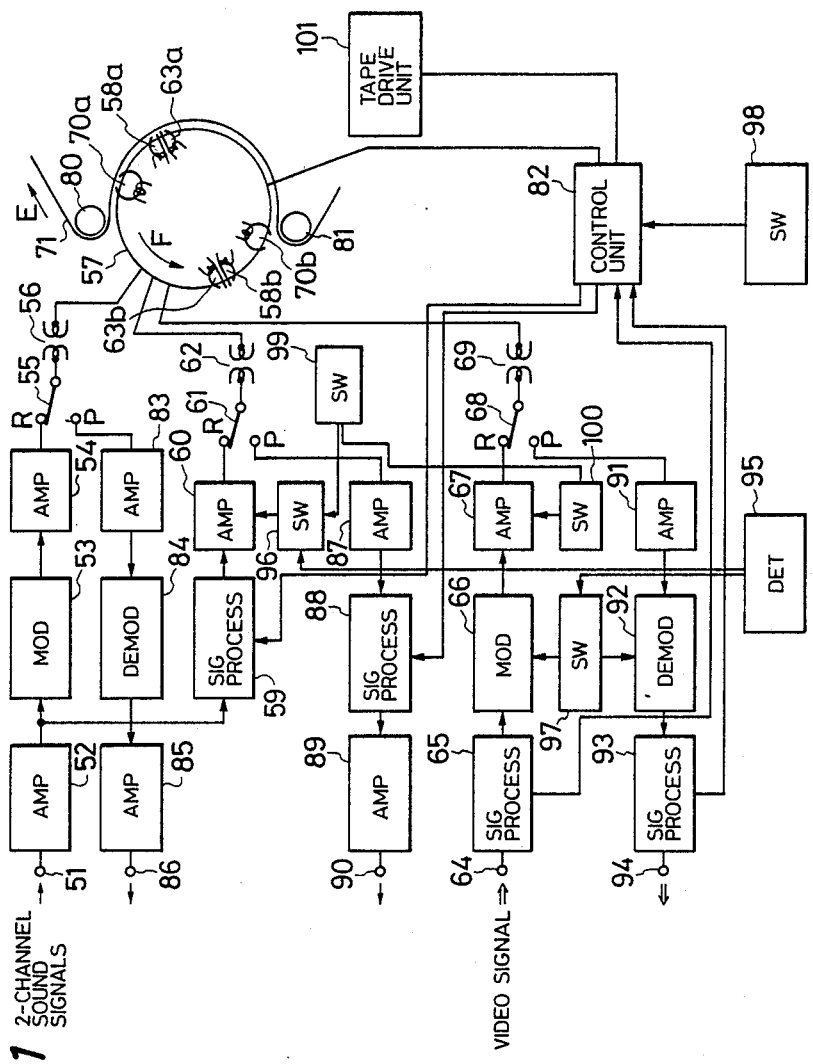
FIG. 1 is a block diagram of a recording and reproducing apparatus according to an embodiment of this invention.

With reference to FIG. 1, a recording and reproducing apparatus includes a first input terminal 51 receiving 2-channel analog sound signals. The received 2-channel sound signals are supplied via an amplifier 52 to a modulator 53 and a digital signal processor 59. The modulator 53 converts the input 2-channel sound signals into corresponding 2-channel FM sound signals. In addition, the modulator 53 mixes the 2-channel FM sound signals to form a multiplex FM sound signal, which is transmitted from the modulator 53 to a fixed contact R of a switch 55 via an amplifier 54. When a movable contact of the switch 55 connects with the fixed contact R thereof, the multiplex FM sound signal is further transmitted from the switch 55 to a first group of magnetic heads 58a and 58b via a rotary transformer 56. The magnetic heads 58a and 58b are carried on a rotatable cylinder 57 so that they rotate together with the cylinder 57. The magnetic heads 58a and 58b are opposed diametrically with respect to the rotatable cylinder 57. During rotation of the magnetic heads 58a and 58b, they move into and out of contact with a magnetic tape 71 and record the multiplex FM sound signal in the tape 71.

The digital signal processor 59 converts the input 2-channel sound signals into corresponding digital sound signals and also performs other signal processes such as the addition of error correction codes to the digital sound signals and an interleaving process of the digital sound signals. In addition, the digital signal processor 59 converts the processed digital sound signals into a quadrature phase shift keying (QPSK) sound signal, which is outputted to an amplifier 60. When the amplifier 60 is enabled, the QPSK sound signal is fed via the amplifier 60 to a fixed contact R of a switch 61. When a movable contact of the switch 61 connects with the fixed contact R thereof, the QPSK sound signal is further transmitted from the switch 61 to a second group of magnetic heads 63a and 63b via a rotary transformer 62. The magnetic heads 63a and 63b are carried on the rotatable cylinder 57 so that they rotate together with the cylinder 57. The magnetic heads 63a and 63b are opposed diametrically with respect to the rotatable cylinder 57. In addition, the magnetic heads 63a and 63b are close to the magnetic heads 58a and 58b respectively. During rotation of the magnetic heads 63a and 63b, they move into and out of contact with the magnetic tape 71 and record the QPSK sound signal in the tape 71.

A second input terminal 64 receives a video signal, which is applied to a signal processor 65 separating the received video signal into a luminance signal and a color signal. The luminance signal and the color signal are applied to a modulator 66. The modulator 66 converts the luminance signal into a corresponding FM luminance signal and also converts the color signal into a corresponding down-converted chrominance signal. The FM luminance signal and the down-converted chrominance signal are combined into a multiplex video signal, which is transmitted from the modulator 66 to a fixed terminal R of a switch 68 via an amplifier 67. When a movable contact of the switch 68 connects with the fixed contact R thereof, the multiplex video signal is further transmitted from the switch 68 to a third group of magnetic heads 70a and 70b via a rotary transformer 69. The magnetic heads 70a and 70b are carried on the rotatable cylinder 57 so that they rotate together with the cylinder 57. The magnetic heads 70a and 70b are opposed diametrically with respect to the rotatable cylinder 57. In addition, the magnetic heads 70a and 70b are spaced from the magnetic heads 58a and 58b at angular intervals of 45-60°. During rotation of the magnetic heads 70a and 70b, they move into and out of contact with the magnetic tape 71 and record the multiplex video signal in the tape 71.

The rotatable cylinder 57 is rotated by an actuator (not shown). The magnetic tape 71 is moved by a tape drive unit 101 while being guided by pins 80 and 81. A control unit 82 adjusts the cylinder drive actuator and the tape drive unit 101 to control rotation of the rotatable cylinder 57 and movement of the magnetic tape 71.

The first group of the magnetic heads 58a and 58b also serves to reproduce the multiplex FM sound signal from the magnetic tape 71. The reproduced multiplex FM sound signal is returned to the switch 55 via the rotary transformer 56. When the movable contact of the switch 55 contacts with a fixed terminal P thereof, the reproduced multiplex FM sound signal is fed from the switch 55 to a demodulator 84 via an amplifier 83. The demodulator 84 recovers the original 2-channel sound signals from the multiplex FM sound signal. The recovered 2-channel sound signals are transmitted from the demodulator 84 to an output terminal 86 via an amplifier 85.

The second group of the magnetic heads 63a and 63b also serves to reproduce the QPSK sound signal from the magnetic tape 71. The reproduced QPSK sound signal is returned to the switch 61 via the rotary transformer 62. When the movable contact of the switch 61 contacts with a fixed terminal P thereof, the reproduced QPSK sound signal is fed from the switch 61 to a digital signal processor 88 via an amplifier 87. The digital signal processor 88 recovers the digital sound signals from the QPSK sound signal and also acts on these digital sound signals with signal processes such as a de-interleaving process, an error correction process, and an interpolation process. In addition, the digital signal processor 88 recovers the original 2-channel sound signals from the processed digital sound signals through digital-to-analog conversion. The 2-channel sound signals are fed from the digital signal processor 88 to an output terminal 90 via an amplifier 89.

The digital signal processors 59 and 88 may be formed as disclosed in "Digital Audio Recording in M II Format VTR" by S. Tsuji et al., in 20th SMPTE Television Conference, No. 24 (Feb. 1986).

The third group of the magnetic heads 70a and 70b also serves to reproduce the multiplex video signal from the magnetic tape 71. The reproduced multiplex video signal is returned to the switch 68 via the rotary transformer 69. When the movable contact of the switch 68 contacts with a fixed terminal P thereof, the multiplex video signal is fed from the switch 68 to a demodulator 92 via an amplifier 91. The demodulator 92 recovers the original luminance signal and the original chrominance signal from the multiplex video signal. A signal processor 93 receives the recovered luminance signal and the recovered chrominance signal from the demodulator 92 and converts them into the original video signal, which is applied to an output terminal 94.

A detector 95 senses an aperture in a magnetic tape cassette and outputs detection signals representative thereof. When receiving the detection signal from the detector 95, a switch 96 changes the amplifier 60 to a state where the amplifier 60 is enabled. When receiving the detection signal from the detector 95, a switch 97 adjusts the modulator 66 and the demodulator 92 and specifically changes the frequency of a carrier of the FM luminance signal to a higher value. A switch 98 adjusts the control unit 82 to double the speed of movement of the magnetic tape 71. A switch 99 preferably of the manually-operated type controls the switch 96 and the switch 100. The switch 100 serves to disable or deactivate the amplifier 67.

Figure 2:
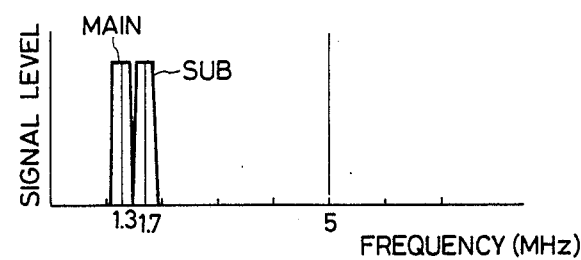
FIG. 2 is a frequency spectrum of the frequency-modulated sound signal handled via the first group of the magnetic heads in the apparatus of FIG. 1.

As shown in FIG. 2, the 2-channel FM modulated sound signals derived via the modulator 53 includes a main channel sound signal and a sub channel sound signal. The main channel sound signal is composed of a carrier having a frequency of 1.3 MHz and being modulated in frequency with sound information. The sub channel sound signal is composed of a carrier having a frequency of 1.7 MHz and being modulated in frequency with sound information. Each of the main and sub FM sound signals has a frequency deviation of −150 to +150 KHz. The 2-channel FM modulated sound signals are mixed and combined into the multiplex FM sound signal by a mixer within the modulator 53.

Portions of the structure and operation of the recording and reproducing apparatus will be described specifically with respect to a recording process.

Figure 3:
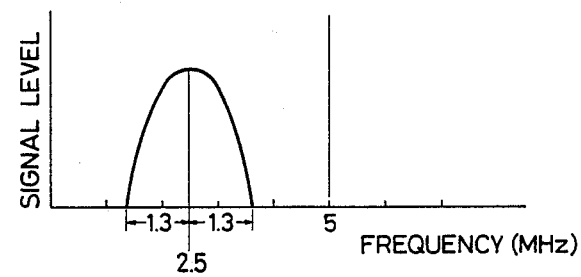
FIG. 3 is a frequency spectrum of the phase-modulated sound signal handled via the second group of the magnetic heads in the apparatus of FIG. 1.

The digital signal processor 59 converts the 2-channel analog sound signals into corresponding 2-channel 16-bit digital sound signals through analog-to-digital conversion using a sampling frequency of 48 KHz. Thus, the 2-channel analog sound signals are quantized in 16 bits. This design of the quantization ensures that the 2-channel analog sound signals maintain an adequate dynamic range after a recording process and a reproducing process. In the digital signal processor 59, after the digital sound signals are subjected to an error-correcting code addition process and an interleaving process, they are synchronized with rotation of the rotatable cylinder 57 and are converted into digital sound signals having a transmission rate of 2.6 Mbits/second. A modulator within the digital signal processor 59 converts these digital sound signals into a quadrature phase shift keying (QPSK) sound signal composed of a carrier which has a frequency of 2.5 MHz as shown in FIG. 3 and which is modulated in phase with sound information and error correction codes. A band pass filter within the digital signal processor 59 limits the frequency band of the QPSK sound signal to a range of −1.3 to +1.3 MHz centered at the carrier frequency 2.5 MHz as shown in FIG. 3. The narrow-band QPSK sound signal maintains an adequate signal-to-noise ratio after undergoing a recording process and a reproducing process.

When the detector 95 senses an aperture in a magnetic tape cassette and outputs the detection signal to the switch 96, the switch 96 activates the amplifier 60 so that the QPSK sound signal is transmitted from the digital signal processor 59 to the switch 61 via the amplifier 60. In this case, the movable contact of the switch 61 normally contacts with the fixed terminal R thereof so that the QPSK sound signal is further transmitted to the second group of the magnetic heads 63a and 63b via the switch 61 and the rotary transformer 62.

The aperture in the magnetic tape cassette represents characteristics of the magnetic tape within the cassette. Specifically, the aperture indicates that the magnetic field generated by the magnetic tape within the cassette is strong enough to record digital sound signals in the magnetic tape.

Figure 4:
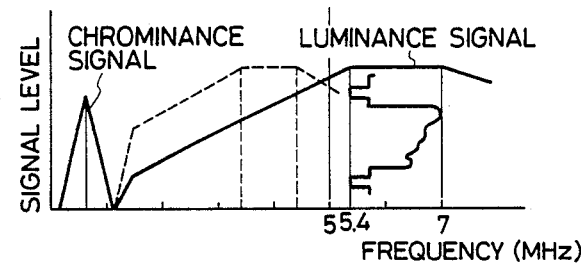
FIG. 4 is a frequency spectrum of the video signal handled via the third group of the magnetic heads in the apparatus of FIG. 1.

As shown in FIG. 4, the down-converted chrominance signal derived via the modulator 66 is composed of a carrier which has a frequency of 629 KHz and which is modulated with color information as in a conventional VHS format. When the detector 95 does not output the detection signal to the switch 97, the switch 97 adjusts the modulator 66 so that the modulator 66 can derive the FM luminance signal which has a 3.4 MHz sync chip and a 4.4 MHz white peak as in a conventional VHS format (see the broken line of FIG. 4). When the detector 95 outputs the detection signal to the switch 97, the switch 97 adjusts the modulator 66 so that the modulator 66 can derive the FM luminance signal which has a 5.4 MHz sync chip and a 7 MHz white peak as shown by the solid line of FIG. 4. In the modulator 66, the FM luminance signal and the down-converted chrominance signal are mixed and combined by a mixer into the multiplexed video signal which is transmitted to the third group of the magnetic heads 70a and 70b. Furthermore, when the detector 95 outputs the detection signal to the switch 97, the switch 97 adjusts the modulator 66 so that the amplitude of the multiplex video signal will be increased by about 20% relative to that in the case where the detection signal is absent.

Figure 6:
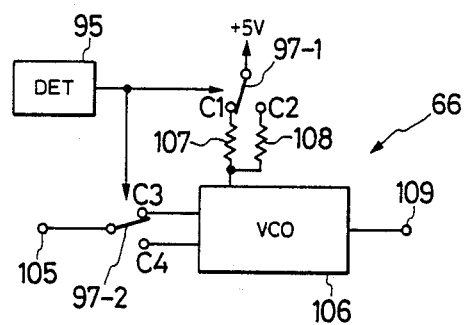
FIG. 6 is a diagram of the modulator and the switch of FIG. 1.

The modulator 66 will be described in detail with reference to FIG. 6. In the absence of a detection output from the detector 95, movable contacts of switches 97-1 and 97-2 are connected to fixed contacts C1 and C3 respectively. It should be noted that the switch 97 is of a double throw type and has linked sub switches 97-1 and 97-2. Since the fixed contact C1 of the switch 97-1 is connected to a 5-volt power supply, a current is supplied to a VCO (Voltage Controlled Oscillator) 106 of the modulator 66 via a resistor 107 so that the VCO 106 oscillates at a frequency of about 4 MHz. Since a luminance signal applied to a terminal 105 is fed to the VCO 106 via the fixed contact C3 of the switch 97-2, the luminance signal is subjected to frequency modulation so that an FM luminance signal appears at an output terminal 109 of the VCO 106. The FM luminance signal has a sync chip at 3.4 MHz and a white peak at 4.4 MHz.

In the presence of a detection output from the detector 95, the movable contacts of the switches 97-1 and 97-2 are connected to fixed contacts C2 and C4 respectively. In this case, a current is supplied to the VCO 106 via a resistor 108 so that the VCO 106 oscillates at a frequency of about 6 MHz. The luminance signal applied to the terminal 105 is fed to the VCO 106 via the fixed contact C4 of the switch 97-2 so that the luminance signal is subjected to frequency modulation with an increased deviation. An FM luminance signal which appears at the output terminal 109 of the VCO 106 has a sync chip at 5.4 MHz and a white peak at 7 MHz.

The magnetic tape 71 normally moves in the direction E and along part of the circumference of the rotatable cylinder 57. The rotatable cylinder 57 normally rotates in the direction F. The direction of movement of the magnetic tape 71 inclines to the direction of rotation of the rotatable cylinder 57 so that recording tracks formed in the magnetic tape 71 by the magnetic heads extend obliquely with respect to the longitudinal axis of the tape 71. The positions of the magnetic heads with respect to the rotatable cylinder 57 are designed so that the first group of the magnetic heads 58a and 58b, the second group of the magnetic heads 63a and 63b, and the third group of the magnetic heads 70a and 70b sequentially form recording tracks at least partially overlapping each other. Specifically, the first group of the magnetic heads 58a and 58b, and the second group of the magnetic heads 63a and 63b are located at equal heights. The magnetic heads 70a and 70b in the third group are located at equal heights lower than the positions of the magnetic heads in the first and second groups.

Figure 5:
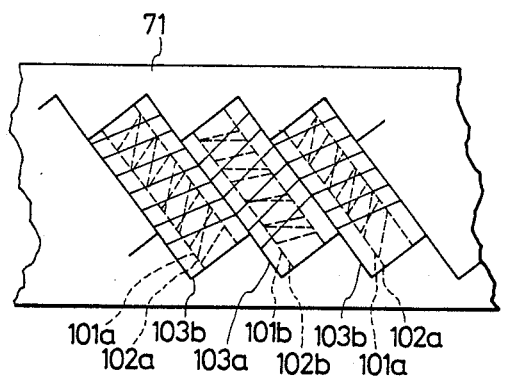
FIG. 5 is a diagram of recording tracks in the magnetic tape in the apparatus of FIG. 1.

FIG. 5 shows recording tracks formed in the magnetic tape 71. The magnetic heads 58a, 58b, 63a, 63b, 70a, 70b record the related signals in tracks 101a, 101b, 102a, 102b, 103a, and 103b respectively. The tracks 101a, 102a, and 103b at least partially overlap each other. The tracks 101b, 102b, and 103a at least partially overlap each other.

The azimuth angles of the magnetic heads 58a and 58b in the first group are +30° and −30° respectively. The azimuth angles of the magnetic heads 63a and 63b in the second group are +20° and −20° respectively. The azimuth angles of the magnetic heads 70a and 70b in the third group are +6° and −6° respectively. This design of the azimuth angles prevents cross talk between recording tracks and ensures high qualities of reproduced video and sound signals. In FIG. 5, the parallel lines within the recording tracks denote the azimuths of the recorded signals.

As understood from FIGS. 2–4, the frequencies of the carriers of the recorded signals are chosen so that high energy components of the different recorded signals can not extend over the same frequency ranges. This design reduces interference between the recorded signals and also decreases the damping degree of the signal which is recorded in the first track before the other signal is recorded in the second track at least partially overlapping the first track.

Portions of the structure and operation of the recording and reproducing apparatus will be described specifically with respect to a reproducing process.

The digital signal processor 88 has a demodulator which recovers the original digital sound signals from the QPSK sound signal outputted by the amplifier 87. In the digital signal processor 88, the recovered digital sound signals are subjected to a de-interleaving process, an error correction process, and a time axis correction process, and are then converted into the original 2-channel analog sound signals through digital-to-analog conversion.

When the detector 95 senses the aperture in the magnetic tape cassette and output the detection signal to the switch 97, the switch 97 adjusts the demodulator 92 so that the range of pulling frequencies of the phase locked loop for recovering the luminance signal is changed to a higher range. In the case where the phase locked loop of the demodulator 92 contains the VCO 106 of the modulator 66, the structure of FIG. 6 allows the change to the higher range in response to a detection output from the detector 95. Thus, in the case of a magnetic tape 71 triggering the detector 95, the frequency of the carrier of the FM luminance signal is changed to a higher value so that the FM luminance signal over a wide frequency band is recorded and a high quality of the reproduced video signal is ensured. It should be noted that the frequency change process responsive to the characteristics of magnetic tapes may be eliminated when the range of pulling frequencies of the phase locked loop is wide.

The recording and reproducing apparatus will be further described in respect of other operation modes.

When an after-recording mode is selected, the switch 98 is activated and adjusts the control unit 82 so that the speed of movement of the magnetic tape 71 is doubled relative to the normal speed. At this double speed, the first recording tracks corresponding to the first group of the magnetic heads 58a and 58b do not overlap the third recording tracks corresponding to the third group of the magnetic heads 70a and 70b, so that the first recording tracks and the third recording tracks can be mutually independently subjected to erasing and recording processes.

During operation in a playback mode, when the sound part is moved to a recording state, the magnetic heads 58a and 58b in the first group and 63a and 63b in the second group record the related sound signal in respective tracks overlapping the tracks in which the previous sound signal was recorded by the magnetic heads 58a and 58b in the first group and 63a and 63b in the second group. As understood from FIGS. 2 and 3, the frequencies of the sound signal recorded by the first group of the magnetic heads 58a and 58b are generally lower than the frequencies of the sound signal recorded by the second group of the magnetic heads 63a and 63b, so that the previously recorded signal related to the second group of the magnetic heads 63a and 63b is greatly damped by recording the sound signal via the first group of the magnetic heads 58a and 58b. Accordingly, the first group of the heads 58a and 58b serve as erasing heads for the sound signal recorded by the second group of the heads 63a and 63b, making it unnecessary to provide exclusive erasing heads. In this way, the recorded sound signal can be replaced while the recorded video signal is maintained as it is.

In the case of a magnetic tape 71 accommodated in a cassette having no aperture sensed by the detector 95, that is, in the case of a magnetic tape 71 which generates weak magnetic fields and which does not trigger the detector 95, sound signals are recorded in the tape 71 as follows. The switch 99 is changed so that the output signal from the switch 99 actuates the switch 96. When the switch 96 is actuated, the switch 96 enables the amplifier 60 and thus the QPSK sound signal outputted from the digital signal processor 59 is amplified before it enters the switch 61. Then, the QPSK sound signal is recorded in the magnetic tape 71 as in the previously-mentioned case. In addition, the output signal from the switch 99 actuates the switch 100. When the switch 100 is actuated, the switch 100 disables the amplifier 67 and thus the video signal outputted from the modulator 66 is not applied to the third group of the magnetic heads 70a and 70b. The FM sound signal is recorded in the magnetic tape 71 as in the previously-mentioned case. Since the gain of the amplifier 60 is lowered, the QPSK sound signal fed to the second group of the magnetic heads 63a and 63b has a decreased value of recording current. The decreased recording current allows improved signal-to-noise ratios of the reproduced FM sound signal and the reproduced QPSK sound signal because the magnetic tape 71 has a low coercivity. In this case, the first group of the magnetic heads 58a and 58b can be used as erasing heads for the signal recorded via the second group of the magnetic heads 63a and 63b.

It should be noted that the third group of the magnetic heads 70a and 70b may be replaced by two pairs of magnetic heads arranged in a conventional manner. In this case, the first pair of the magnetic heads is used in a way similar to the magnetic heads 70a and 70b and the second pair of the magnetic heads is used for a long-time recording.

What is claimed is:
1. A recording and reproducing apparatus comprising:
   (a) a first group of magnetic heads having different azimuth angles, a second group of magnetic heads having different azimuth angles which also differ from the azimuth angles of the magnetic heads in the first group, and a third group of magnetic heads having different azimuth angles which also differ from the azimuth angles of the magnetic heads in the first and second groups;
   (b) a first modulator converting a first input signal into a corresponding frequency-modulated signal;
   (c) means for applying an output signal of the first modulator to the first group of the magnetic heads;
   (d) a first demodulator demodulating a signal reproduced via the first group of the magnetic heads;
   (e) a first digital signal processor converting the first input signal into a corresponding digital signal and processing the digital signal;
   (f) means for applying an output signal of the digital signal processor to the second group of the magnetic heads;
   (g) a second digital signal processor processing a signal reproduced via the second group of the magnetic heads and converting the reproduced and processed signal into an analog signal;
   (h) a first signal processor separating an input video signal into a luminance signal and a color signal;
   (i) a second modulator converting output signals of the first signal processor into a corresponding frequency-modulated luminance signal and a corresponding down-converted chrominance signal;

(j) means for applying an output signal of the second modulator to the third group of the magnetic heads;

(k) a second demodulator converting a signal, reproduced via the third group of the magnetic heads, into a luminance signal and a color signal;

(l) a second signal processor converting output signals of the second demodulator into a video signal;

(m) a detector sensing a sensed portion of a magnetic tape cassette and generating a detection signal representative thereof;

(n) means for enabling the application of the output signal of the first digital signal processor to the second group of the magnetic heads in accordance with the detection signal; and (o) means for increasing a frequency of a carrier of the frequency-modulated luminance signal in accordance with the detection signal.

2. The apparatus of claim 1 wherein the first group of the magnetic heads records the related signal in first tracks in a magnetic tape; the second group of the magnetic heads records the related signal in second tracks in the magnetic tape; the third group of the magnetic heads records the related signal in third tracks in the magnetic tape; and the first, second, and third tracks at least partially overlap each other.

3. The apparatus of claim 1 wherein the first input signal is composed of 2-channel signals; the first modulator outputs two different frequency-modulated signals corresponding to the respective 2-channel signals and having different carrier frequencies; and the first digital signal processor outputs a quadrature phase shift keying signal corresponding to the 2-channel signals.

4. The apparatus of claim 1 wherein the carrier frequencies of the frequency-modulated output signals of the first modulator are higher than frequencies of the down-converted chrominance signal, and frequencies of the quadrature phase shift keying output signal of the first digital signal processor are higher than the carrier frequencies of the frequency-modulated output signals of the first modulator.

5. The apparatus of claim 1 further comprising means for interrupting the application of the output signal of the second modulator to the third group of the magnetic heads.

* * * * *